United States Patent
Fujita

(10) Patent No.: US 10,538,137 B2
(45) Date of Patent: Jan. 21, 2020

(54) VEHICLE TRAVEL CONTROL DEVICE

(71) Applicant: TOYOTA JIDOSHA KABUSHIKI KAISHA, Toyota-shi, Aichi-ken (JP)

(72) Inventor: Yoshitaka Fujita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 15/795,806

(22) Filed: Oct. 27, 2017

(65) Prior Publication Data

US 2018/0178610 A1 Jun. 28, 2018

(30) Foreign Application Priority Data

Dec. 27, 2016 (JP) ................................ 2016-253807

(51) Int. Cl.
*B60G 17/016* (2006.01)
*B60G 17/0165* (2006.01)
*B60G 21/055* (2006.01)

(52) U.S. Cl.
CPC ..... *B60G 17/0164* (2013.01); *B60G 17/0165* (2013.01); *B60G 21/0555* (2013.01); *B60G 2202/42* (2013.01); *B60G 2202/442* (2013.01); *B60G 2400/106* (2013.01); *B60G 2400/204* (2013.01); *B60G 2400/61* (2013.01); *B60G 2400/822* (2013.01); *B60G 2800/012* (2013.01); *B60G 2800/016* (2013.01); *B60G 2800/214* (2013.01)

(58) Field of Classification Search
CPC ............ B60G 17/0164; B60G 17/0165; B60G 21/0555; B60G 2400/822; B60G 2202/42; B60G 2400/204; B60G 2400/106; B60G 2400/61; B60G 2800/012; B60G 2800/016; B60G 2800/214; B60G 2202/442

See application file for complete search history.

(56) References Cited

U.S. PATENT DOCUMENTS 6,663,113 B2 * 12/2003 Schulke ............. B60G 17/0165
 280/5.505
7,311,316 B2 * 12/2007 Yasui ................. B60G 17/0162
 280/124.106

(Continued)

FOREIGN PATENT DOCUMENTS

JP 2005-349914 A 12/2005
JP 2008-285006 A 11/2008

(Continued)

*Primary Examiner* — Paul N Dickson
(74) *Attorney, Agent, or Firm* — Oliff PLC

(57) ABSTRACT

A first active stabilizer is installed on a main drive wheel side, and a second active stabilizer is installed on a subordinate drive wheel side. A control device performs load distribution control when a difference in actual driving force between left and right sides of a vehicle exceeds a threshold value during acceleration. A high-μ side is one of the left and right sides with a greater actual driving force, and a low-μ side is another of the left and right sides. The load distribution control includes a first mode performed when a vehicle speed is equal to or lower than a first reference value. In the first mode, the control device actuates the first active stabilizer in a direction to lift up the high-μ side and actuates the second active stabilizer in a direction to lift up the low-μ side.

14 Claims, 15 Drawing Sheets

(56) References Cited

U.S. PATENT DOCUMENTS

| | | | |
|---|---|---|---|
| 7,354,048 B2 * | 4/2008 | Suzuki | B60G 17/0162 280/124.106 |
| 7,418,325 B2 * | 8/2008 | Yamada | B60G 17/0182 280/5.502 |
| 7,431,309 B2 * | 10/2008 | Kobayashi | B60G 17/0152 280/6.159 |
| 7,501,786 B2 * | 3/2009 | Yasui | B60G 17/0162 318/610 |
| 7,543,823 B2 * | 6/2009 | Buma | B60G 17/0162 280/5.502 |
| 7,725,226 B2 * | 5/2010 | Urababa | B60G 17/0162 280/5.506 |
| 7,798,498 B2 * | 9/2010 | Buma | B60G 17/0162 280/5.511 |
| 7,860,623 B2 * | 12/2010 | Bauer | B60T 8/175 180/197 |
| 7,871,083 B2 * | 1/2011 | Urababa | B60G 17/0162 280/5.511 |
| 7,896,360 B2 * | 3/2011 | Buma | B60G 17/0161 280/5.502 |
| 8,050,818 B2 * | 11/2011 | Mizuta | B60G 17/0162 180/197 |
| 8,880,316 B2 * | 11/2014 | Nishikawa | B60T 8/1755 701/41 |
| 2006/0069480 A1 * | 3/2006 | Hiwatashi | B62D 6/003 701/41 |
| 2007/0018414 A1 * | 1/2007 | Yasui | B60G 17/0157 280/5.511 |
| 2007/0150144 A1 * | 6/2007 | Yasui | B60G 17/0162 701/38 |
| 2008/0283325 A1 * | 11/2008 | Kodama | B60G 17/0164 180/243 |
| 2010/0102521 A1 * | 4/2010 | Hidaka | B60G 17/0165 280/5.508 |

FOREIGN PATENT DOCUMENTS

| | | |
|---|---|---|
| JP | 2010-195089 A | 9/2010 |
| JP | 2010-215068 A | 9/2010 |

* cited by examiner

|  | FWD | RWD |
|---|---|---|
| MAIN DRIVE WHEEL | 10FL, 10FR | 10RL, 10RR |
| SUBORDINATE DRIVE WHEEL | 10RL, 10RR | 10FL, 10FR |
| FIRST ACTIVE STABILIZER | FRONT ACTIVE STABILIZER 50 | REAR ACTIVE STABILIZER 60 |
| SECOND ACTIVE STABILIZER | REAR ACTIVE STABILIZER 60 | FRONT ACTIVE STABILIZER 50 |
| FIRST MODE | RL INCREASE MODE | RR INCREASE MODE |
| SECOND MODE | RR INCREASE MODE | RL INCREASE MODE |

Fig. 8

VEHICLE TRAVEL CONTROL DEVICE

BACKGROUND

Technical Field

The present disclosure relates to vehicle travel control when a difference in driving force between left and right wheels occurs during acceleration of a vehicle.

Background Art

During braking or acceleration on a split-μ road, a yaw moment is generated in a vehicle due to a difference in braking force or driving force between left and right wheels. Patent Literature 1 discloses a technique that detects such the yaw moment and performs turning control to counteract the detected yaw moment. Patent Literature 2 discloses a technique that detects a yaw moment generated during braking on a split-μ road and performs turning control to counteract the detected yaw moment.

Patent Literature 3 discloses an active stabilizer for suppressing a roll behavior during cornering.

LIST OF RELATED ART

Patent Literature 1: Japanese Laid-Open Patent Publication No. 2005-349914

Patent Literature 2: Japanese Laid-Open Patent Publication No. 2010-195089

Patent Literature 3: Japanese Laid-Open Patent Publication No. 2010-215068

SUMMARY

According to the technique disclosed in Patent Literature 1 mentioned above, the turning control is performed during acceleration of the vehicle in order to counteract the yaw moment caused by the difference in driving force between left and right wheels. It is expected that a vehicle attitude is stabilized by the turning control. However, even when the turning control is performed, the driving force is not increased and thus acceleration performance is not increased.

An object of the present disclosure is to provide a technique that can increase acceleration performance when a difference in driving force between left and right wheels occurs during acceleration of a vehicle.

A first disclosure provides a vehicle travel control device.

The vehicle travel control device includes:

a driving device driving at least a main drive wheel among the main drive wheel and a subordinate drive wheel of a vehicle;

a first active stabilizer installed on a side of the main drive wheel;

a second active stabilizer installed on a side of the subordinate drive wheel; and a control device performing load distribution control when a difference in actual driving force between a left side and a right side of the vehicle exceeds a threshold value during acceleration.

A high-μ side is one of the left side and the right side with a greater actual driving force, and a low-μ side is another of the left side and the right side.

The load distribution control includes a first mode performed when a speed of the vehicle is equal to or lower than a first reference value.

In the first mode, the control device actuates the first active stabilizer in a direction to lift up the high-μ side and actuates the second active stabilizer in a direction to lift up the low-μ side.

A second disclosure further has the following features in addition to the first disclosure.

The load distribution control further includes a second mode performed when the speed is higher than a second reference value equal to or greater than the first reference value.

In the second mode, the control device actuates the first active stabilizer in a direction to lift up the low-μ side and actuates the second active stabilizer in a direction to lift up the high-μ side.

A third disclosure further has the following features in addition to the second disclosure.

A period of the acceleration includes a first period and a second period later than the first period.

In the first period, the speed is equal to or lower than the first reference value and the control device performs the load distribution control in the first mode.

In the second period, the speed is higher than the second reference value and the control device performs the load distribution control in the second mode.

A fourth disclosure further has the following features in addition to the third disclosure.

The control device controls the driving device such that a driving force by the driving device becomes smaller in the second period than in the first period.

A fifth disclosure provides a vehicle travel control device.

The vehicle travel control device includes:

a driving device driving at least a main drive wheel among the main drive wheel and a subordinate drive wheel of a vehicle;

a first active stabilizer installed on a side of the main drive wheel;

a second active stabilizer installed on a side of the subordinate drive wheel; and a control device performing load distribution control when a difference in actual driving force between a left side and a right side of the vehicle exceeds a threshold value during acceleration.

A high-μ side is one of the left side and the right side with a greater actual driving force, and a low-μ side is another of the left side and the right side.

When a speed of the vehicle is higher than a reference value, the control device actuates the first active stabilizer in a direction to lift up the low-μ side and actuates the second active stabilizer in a direction to lift up the high-μ side.

A sixth disclosure provides a vehicle travel control device.

The vehicle travel control device includes:

a driving device driving at least a main drive wheel among the main drive wheel and a subordinate drive wheel of a vehicle;

a first active stabilizer installed on a side of the main drive wheel;

a second active stabilizer installed on a side of the subordinate drive wheel; and a control device performing load distribution control when a difference in actual driving force between a left side and a right side of the vehicle exceeds a threshold value during acceleration.

A high-μ side is one of the left side and the right side with a greater actual driving force, and a low-μ side is another of the left side and the right side.

A driving force of and a vertical load on the main drive wheel on the high-μ side are a high-μ side driving force and a high-μ side vertical load, respectively.

The load distribution control includes a first mode performed when the high-μ side driving force is equal to or greater than the high-μ side vertical load.

In the first mode, the control device actuates the first active stabilizer in a direction to lift up the high-μ side and actuates the second active stabilizer in a direction to lift up the low-μ side.

A seventh disclosure further has the following features in addition to the sixth disclosure.

The load distribution control further includes a second mode performed when the high-μ side driving force is smaller than the high-μ side vertical load.

In the second mode, the control device actuates the first active stabilizer in a direction to lift up the low-μ side and actuates the second active stabilizer in a direction to lift up the high-μ side.

An eighth disclosure further has the following features in addition to the seventh disclosure.

A period of the acceleration includes a first period and a second period later than the first period.

The control device controls the driving device such that a driving force by the driving device becomes smaller in the second period than in the first period.

In the first period, the control device performs the load distribution control in the first mode.

In the second period, the control device performs the load distribution control in the second mode.

A ninth disclosure further has the following features in addition to any one of the first to eighth disclosures.

When a lateral acceleration of the vehicle is equal to or higher than a lateral acceleration threshold value, the control device multiplies a control amount of each of the first active stabilizer and the second active stabilizer for the load distribution control by a correction gain less than 1.

A tenth disclosure further has the following features in addition to any one of the first to ninth disclosures.

The control device performs the load distribution control such that a roll moment caused by actuation of the first active stabilizer and a roll moment caused by actuation of the second active stabilizer are balanced.

According to the present disclosure, when the difference in actual driving force between left and right wheels exceeds the threshold value during acceleration of the vehicle, the load distribution control is performed. In the first mode of the load distribution control, the first active stabilizer is actuated in a direction to lift up the high-μ side, and the second active stabilizer is actuated in a direction to lift up the low-μ side. As a result, the vertical load on the main drive wheel on the high-μ side is increased, which makes it possible to efficiently increase a total actual driving force. Accordingly, the acceleration performance is increased.

In the second mode of the load distribution control, the first active stabilizer is actuated in a direction to lift up the low-μ side, and the second active stabilizer is actuated in a direction to lift up the high-μ side. As a result, the vertical load on the main drive wheel on the low-μ side is increased, which makes it possible to increase a total actual driving force. Accordingly, the acceleration performance is increased.

BRIEF DESCRIPTION OF DRAWINGS

FIG. 8 is a diagram showing in a generalized manner the load distribution control according to the present embodiment;

EMBODIMENTS

Embodiments of the present disclosure will be described below with reference to the attached drawings.

1. Outline 1-1. Load Distribution Control

Let us first explain "load distribution control" serving as a basis for the present embodiment. Here, the load distribution control is to actively control a vertical load on each wheel of a vehicle.

Figure 1:
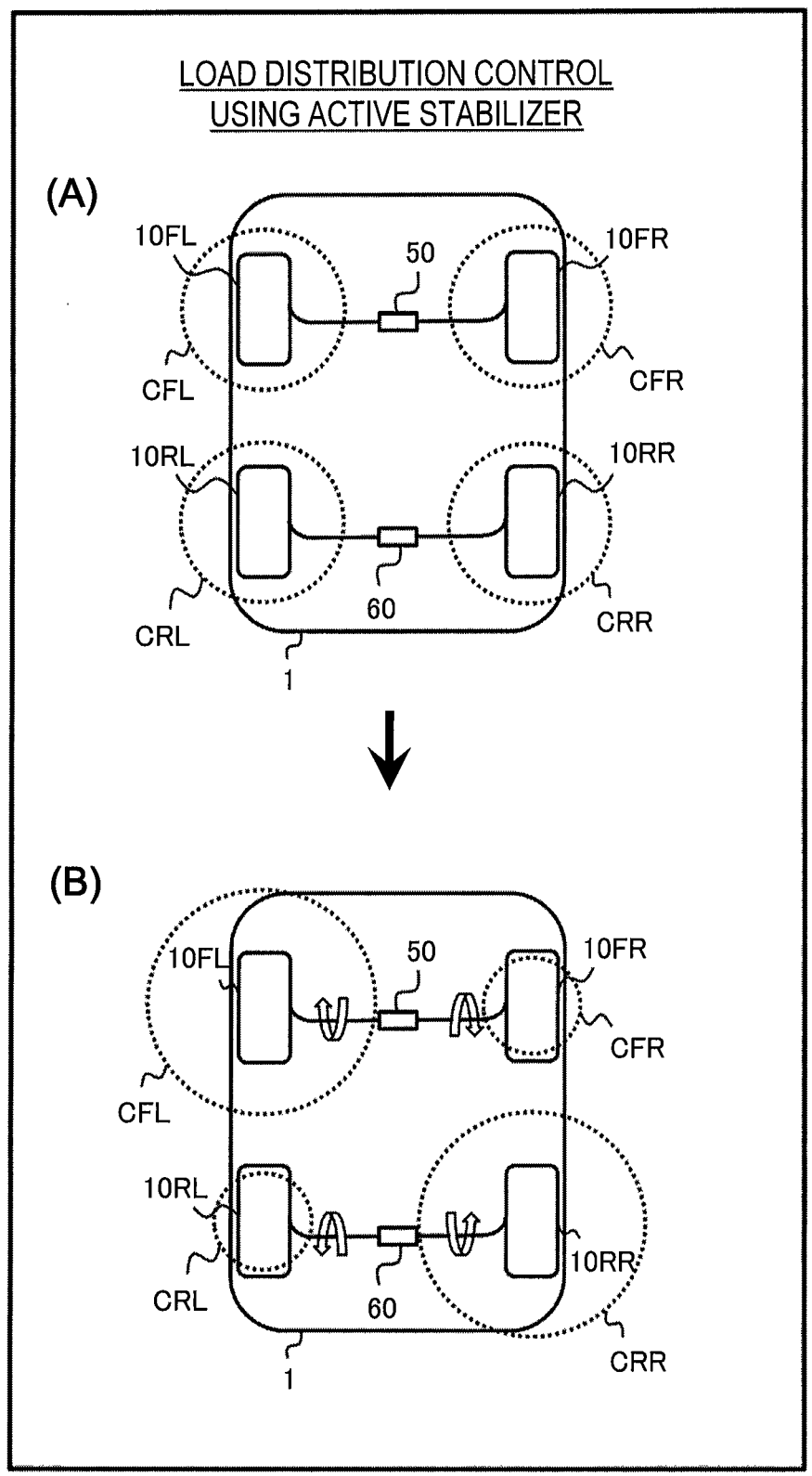
FIG. 1 is a conceptual diagram for explaining load distribution control according to an embodiment of the present disclosure.

FIG. 1 is a conceptual diagram for explaining the load distribution control according to the present embodiment. The vehicle 1 is provided with a left front wheel 10FL, a right front wheel 10FR, a left rear wheel 10RL, and a right rear wheel 10RR. In the following description, the left front wheel 10FL and the right front wheel 10FR may be collectively referred to as a "front wheel", and the left rear wheel 11RL and the right rear wheel 10RR may be collectively referred to as a "rear wheel". The left front wheel 10FL and the left rear wheel 10RL may be collectively referred to as a "left wheel", and the right front wheel 10FR and the right rear wheel 10RR may be collectively referred to as a "right wheel".

In the present embodiment, the load distribution control is performed by the use of an active stabilizer. The active stabilizer can actively twist a stabilizer bar by using an actuator (electric motor), and thereby can control a roll angle of the vehicle 1. As shown in FIG. 1, the vehicle 1 according to the present embodiment is provided with both a front active stabilizer 50 and a rear active stabilizer 60. The front active stabilizer 50 is installed on the front wheel side of the vehicle 1. On the other hand, the rear active stabilizer 60 is installed on the rear wheel side of the vehicle 1.

STATE (A) in FIG. 1 indicates a state before the load distribution control is performed. For simplicity, let us consider a case where load is equally applied to the left front wheel 10FL, the right front wheel 10FR, the left rear wheel 10RL, and the right rear wheel 10RR in STATE (A). Friction ellipses CFL, CFR, CRL, and CRR with regard to the left front wheel 10FL, the right front wheel 10FR, the left rear wheel 10RL, and the right rear wheel 10RR, respectively, are also conceptually shown.

STATE (B) in FIG. 1 indicates a state during the load distribution control. In STATE (B), the front active stabilizer 50 is actuated in a direction to lift up the side of the left front wheel 10FL and pull down the side of the right front wheel 10FR. At the same time, the rear active stabilizer 60 is actuated in a direction to pull down the side of the left rear wheel 10RL and lift up the side of the right rear wheel 10RR. That is to say, the front active stabilizer 50 and the rear active stabilizer 60 are actuated in the opposite directions (opposite phases).

When the actuation directions of the front active stabilizer 50 and the rear active stabilizer 60 are opposite to each other, a direction of a roll moment caused by the actuation of the front active stabilizer 50 and a direction of a roll moment caused by the actuation of the rear active stabilizer 60 also are opposite to each other. When the roll moment caused by the actuation of the front active stabilizer 50 and the roll moment caused by the actuation of the rear active stabilizer 60 are completely balanced, the roll angle of the vehicle 1 does not change.

Figure 2:
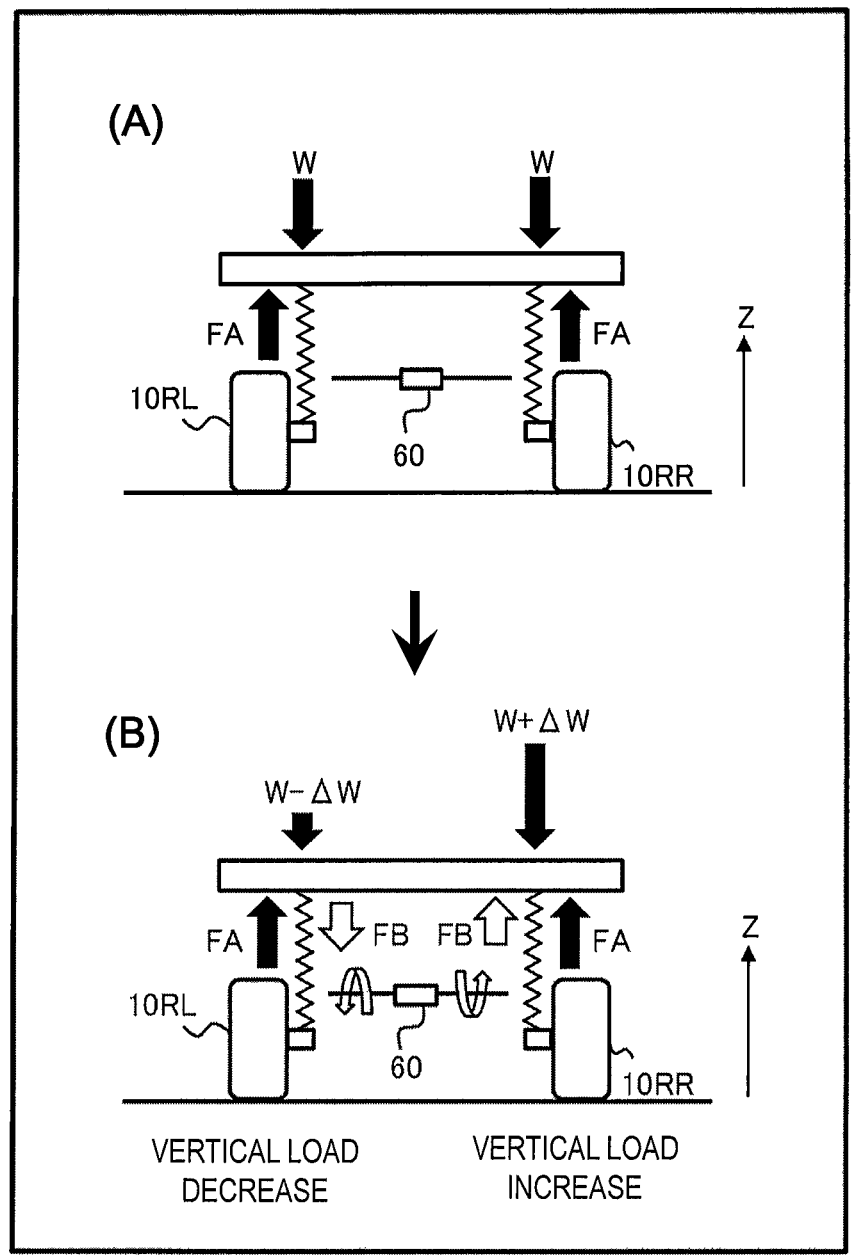
FIG. 2 is a conceptual diagram for explaining load distribution control according to the embodiment of the present disclosure.

FIG. 2 conceptually illustrates change in the vertical load on the rear wheels (10RL, 10RR) due to the load distribution control. Here, let us consider a case where the roll moment caused by the actuation of the front active stabilizer 50 and the roll moment caused by the actuation of the rear active stabilizer 60 are completely balanced and thus the roll angle does not change.

In STATE (A) before the load distribution control is performed, load W of a sprung mass is applied to each of the side of the left rear wheel 10RL and the side of the right rear wheel 10RR. The rear active stabilizer 60 is not actuated, and the rear active stabilizer 60 does not apply any force to the vehicle body. A suspension is contracted according to the load W, and a repulsive force FA is generated in +Z-direction (upward). That is, the load W and the repulsive force FA are balanced.

In STATE (B) during the load distribution control, the rear active stabilizer 60 applies a force FB in a direction (i.e. +Z-direction) to lift up the vehicle body on the side of the right rear wheel 10RR. Meanwhile, since the roll angle has not changed, the repulsive force FA has not changed either since STATE (A). As a result, a force of "FA+FB" in the +Z-direction acts on the vehicle body on the side of the right rear wheel 10RR. The load balancing with the force "FA+FB" is "W+ΔW". That is to say, the load is increased by the amount of the force FB as compared with STATE (A).

The increase ΔW in the load is due to the fact that the front active stabilizer 50 applies the force in a direction to lift up the side of the left front wheel 10FL on the diagonal. That is, the force lifting up the side of the left front wheel 10FL acts in a direction to push down the side of the right rear wheel 10RR, which appears as the increase ΔW in the load. In other words, as a result of the balance between the forces lifting up the side of the left front wheel 10FL and the side of the right rear wheel 10RR on the diagonal, the load is increased with the roll angle remaining unchanged.

Similarly, in STATE (B) during the load distribution control, the rear active stabilizer 60 applies a force FB in a direction (i.e. −Z-direction) to pull down the vehicle body on the side of the left rear wheel 10RL. Meanwhile, since the roll angle has not changed, the repulsive force FA has not changed either since STATE (A). As a result, a force of "FA−FB" in the +Z-direction acts on the vehicle body on the side of the left rear wheel 10RL. The load balancing with the force "FA−FB" is "W−ΔW". That is to say, the load is decreased by the amount of the force FB as compared with STATE (A).

The decrease ΔW in the load is due to the fact that the front active stabilizer 50 applies the force in a direction to pull down the side of the right front wheel 10FR on the diagonal. That is, the force pulling down the side of the right front wheel 10FR acts in a direction to pull up the side of the left rear wheel 10RL, which appears as the decrease ΔW in the load. In other words, as a result of the balance between the forces pulling down the side of the right front wheel 10FR and the side of the left rear wheel 10RL on the diagonal, the load is decreased with the roll angle remaining unchanged.

As described above, according to the load distribution control shown in FIGS. 1 and 2, the vertical loads on the right rear wheel 10RR and the left front wheel 10FL increase, while the vertical loads on the left rear wheel 10RL and the right front wheel 10FR decrease. Therefore, as shown in STATE (B) in FIG. 1, the respective friction ellipses CRR and CFL of the right rear wheel 10RR and the left front wheel 10FL expand, while the respective friction ellipses CRL and CFR of the left rear wheel 10RL and the right front wheel 10FR shrink.

Figure 3:
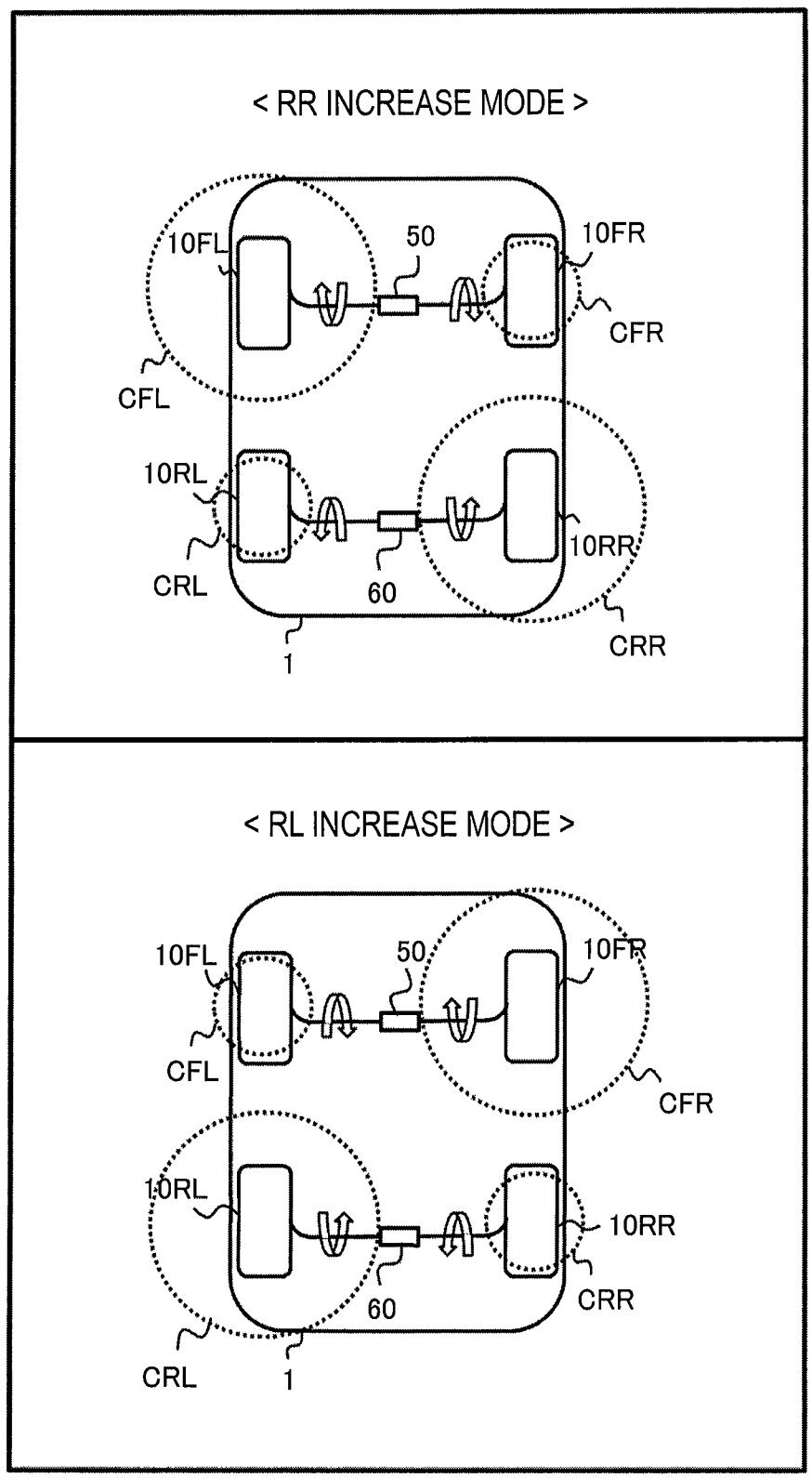
FIG. 3 is a conceptual diagram showing two modes of the load distribution control according to the embodiment of the present disclosure.

When the actuation directions of the front active stabilizer 50 and the rear active stabilizer 60 are opposite to those shown in FIGS. 1 and 2, increase and decrease in the vertical load are inverted accordingly. Therefore, two modes, "RR increase mode" and "RL increase mode" as shown in FIG. 3 are possible as a mode of the load distribution control.

The RR increase mode is the same as the case shown in FIGS. 1 and 2. That is, the front active stabilizer 50 is actuated in a direction to lift up the side of the left front wheel 10FL and pull down the side of the right front wheel 10FR. At the same time, the rear active stabilizer 60 is actuated in a direction to pull down the side of the left rear wheel 10RL and lift up the side of the right rear wheel 10RR. As a result, the vertical loads on the right rear wheel 10RR and the left front wheel 10FL increase, while the vertical loads on the left rear wheel 10RL and the right front wheel 10FR decrease.

The RL increase mode is opposite to the case shown in FIGS. 1 and 2. That is, the front active stabilizer 50 is actuated in a direction to pull down the side of the left front wheel 10FL and lift up the side of the right front wheel 10FR. At the same time, the rear active stabilizer 60 is actuated in a direction to lift up the side of the left rear wheel 10RL and pull down the side of the right rear wheel 10RR. As a result, the vertical loads on the right rear wheel 10RR and the left front wheel 10FL decrease, while the vertical loads on the left rear wheel 10RL and the right front wheel 10FR increase.

It should be noted that, in the load distribution control, it is not absolutely necessary to completely balance the roll moment caused by the actuation of the front active stabilizer 50 and the roll moment caused by the actuation of the rear active stabilizer 60. Even when the both roll moments are not balanced, the vertical load increases to some extent. The important thing is to actuate the front active stabilizer 50 and the rear active stabilizer 60 in the opposite directions (opposite phases). Nonetheless, when the both roll moments are completely balanced, the roll angle does not change, which is preferable in terms of stabilization of the vehicle attitude and reduction in a driver's feeling of strangeness.

1-2. Application to Driving Control

The load distribution control described above is applied to driving control during acceleration of the vehicle 1. In particular, the load distribution control is used when a difference in actual driving force between left and right wheels occurs.

Figure 4:
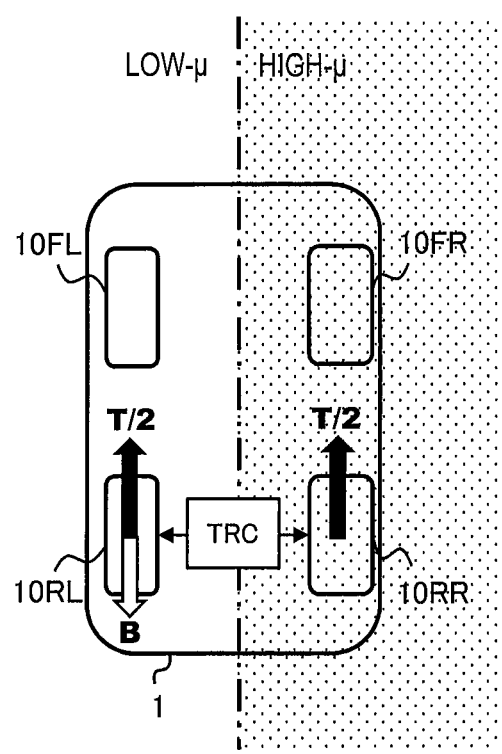
FIG. 4 is a conceptual diagram for explaining driving control when a difference in actual driving force between left and right wheels occurs during acceleration of a vehicle.

FIG. 4 is a conceptual diagram for explaining driving control when a difference in actual driving force between left and right wheels occurs during acceleration of the vehicle 1. The vehicle 1 accelerates on a split-μ road. On the split-μ road, a coefficient of static friction (μ) is different between the left wheel side and the right wheel side. In the example shown in FIG. 4, the left wheel side is a low-μ side and the right wheel side is a high-μ side. In the following description, each of the left front wheel 10FL and the left rear wheel 10RL may be referred to as a "low-μ side wheel", and each of the right front wheel 10FR and the right rear wheel 10RR may be referred to as a "high-μ side wheel".

As an example, FIG. 4 shows a case of rear-wheel drive (RWD). When an usual differential gear is used, a driving force T generated by an engine is equally distributed to the left rear wheel 10RL and the right rear wheel 10RR. That is, a driving force T/2 is given to each of the low-μ side wheel 10RL and the high-μ side wheel 10RR. In this case, the low-μ side wheel 10RL may slip.

In order to suppress the slip of the low-μ side wheel 10RL, "traction control (TRC: TRaction Control)" is performed. The traction control decreases the driving force T and applies a braking force B to the low-μ side wheel 10RL in order to suppress the slip of the low-μ side wheel 10RL. As a result, the actual driving force of the low-μ side wheel 10RL becomes "T/2−B". A total actual driving force being a sum of the actual driving force of the high-μ side wheel 10RR and the actual driving force of the low-μ side wheel 10RL becomes "T−B".

According to the present embodiment, the above-described load distribution control is used for increasing the total actual driving force (T−B). In particular, according to the present embodiment, the RR increase mode and the RL increase mode shown in FIG. 3 are used properly depending on a state of the driving control. A state in which the RR increase mode is preferable is hereinafter referred to as a "first state SA". On the other hand, a state in which the RL increase mode is preferable is hereinafter referred to as a "second state SB".

Figure 5:
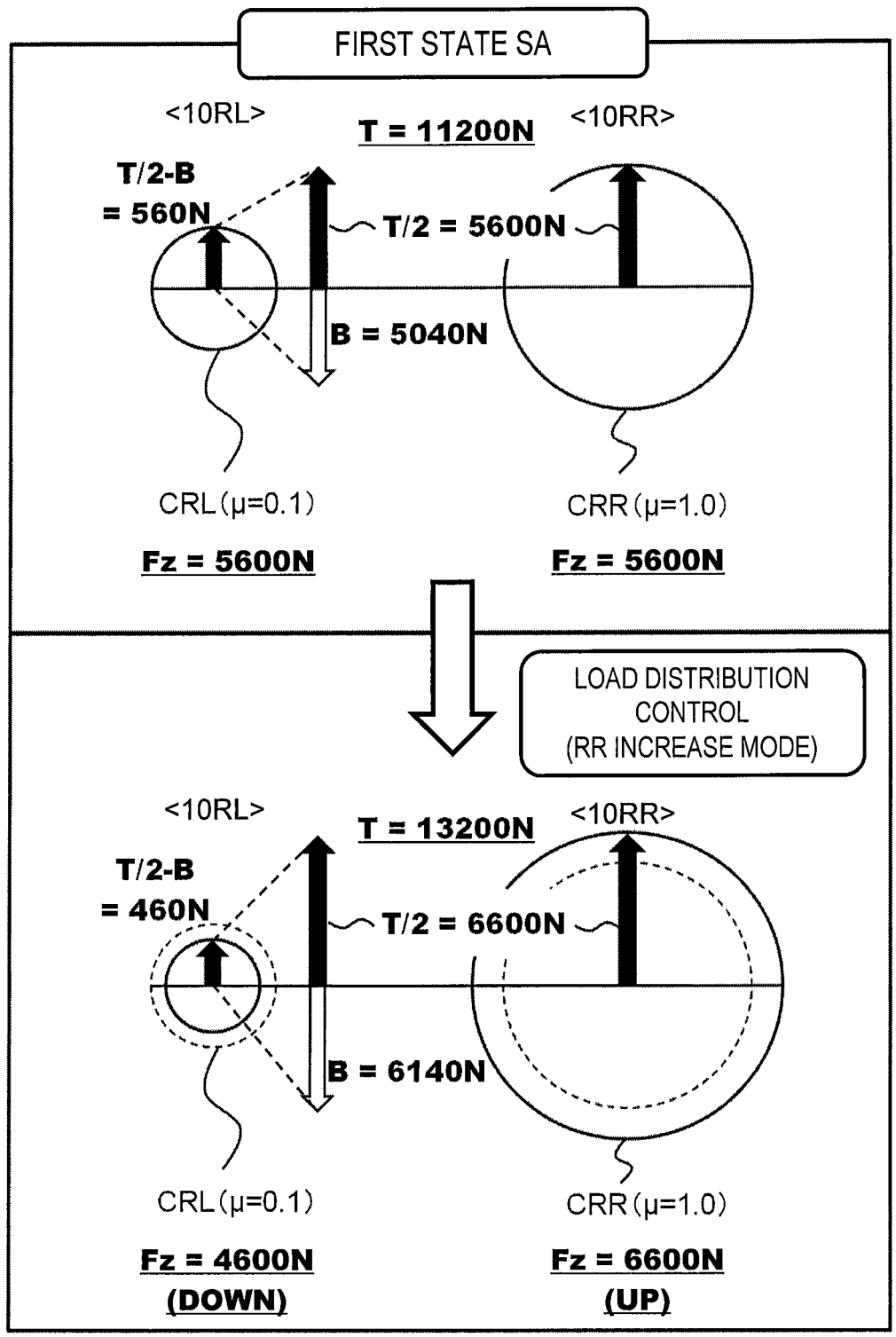
FIG. 5 is a conceptual diagram for explaining an effect when the load distribution control according to the present embodiment is performed in a first state.

FIG. 5 is a conceptual diagram for explaining an effect when the load distribution control (specifically, the RR increase mode) is performed in the first state SA. The friction ellipses CRR and CRL with regard to the high-μ side wheel 10RR and the low-μ side wheel 10RL also are conceptually shown in FIG. 5. In this example, the coefficients of static friction on the high-μ side and the low-μ side are 1.0 and 0.1, respectively.

First, let us consider a comparative example where the load distribution control is not performed. The vertical loads Fz on the low-μ side wheel 10RL and the high-μ side wheel 10RR are the same, 5600 N for example. The driving force T is 11200 N, and thus the driving force T/2=5600 N is supplied to each of the high-μ side wheel TORR and the low-μ side wheel 10RL. Regarding the high-μ side wheel 10RR, the driving force T/2 is equal to the vertical load Fz. That is, the driving force T is set to be large to an extent preventing the high-μ side wheel 10RR from slipping. On the other hand, the braking force B=5040 N is applied to the low-μ side wheel 10RL in order to suppress slipping. As a result, the actual driving force of the low-μ side wheel 10RL becomes 560 N (=5600 N−5040 N). Therefore, the total actual driving force is 6160 N (=5600 N+560 N).

Next, let us consider a case where the load distribution control is performed. In the case of the first state SA, the load distribution control is performed in the "RR increase mode" among the two modes shown in FIG. 3. As a result, for example, the vertical load Fz on the high-μ side wheel 10RR is increased by 1000 N to be 6600 N, and the vertical load Fz on the low-μ side wheel 10RL is decreased by 1000 N to be 4600 N. In this case, it is possible to increase the driving force T/2 of the high-μ side wheel 10RR to 6600 N. In other words, it is possible to increase the driving force T to 13200 N. The driving force T/2=6600 N is supplied to the low-μ side wheel 10RL, and the braking force B=6140 N is applied thereto in order to suppress slipping. As a result, the actual driving force of the low-μ side wheel 10RL becomes 460 N (=6600 N−6140 N). Therefore, the total actual driving force becomes 7060 N (=6600 N+460 N). This means that the total actual driving force increases by about 14.6% as compared with the comparative example where the load distribution control is not performed.

In view of the above, it is preferable to perform the load distribution control in the RR increase mode when the driving force T/2 of the high-μ side wheel 10RR is equal to or greater than the vertical load Fz. As a result, the vertical load Fz on the high-μ side wheel 10RR is increased, which makes it possible to efficiently increase the total actual driving force.

However, as can be seen from FIG. 5, when the driving force T is increased, the braking force B necessary for suppressing the slip of the low-μ side wheel 10RL also is increased. It is not desirable that a state where the strong braking force B is applied continues for a long time during acceleration of the vehicle 1. For decreasing the braking force B to some extent, it is necessary to decrease the driving force T as well. Such the state where the driving force T (i.e. the braking force B) is decreased is the second state SB. In the second state SB, the load distribution control is preferably performed in the RL increase mode instead of the RR increase mode.

Figure 6:
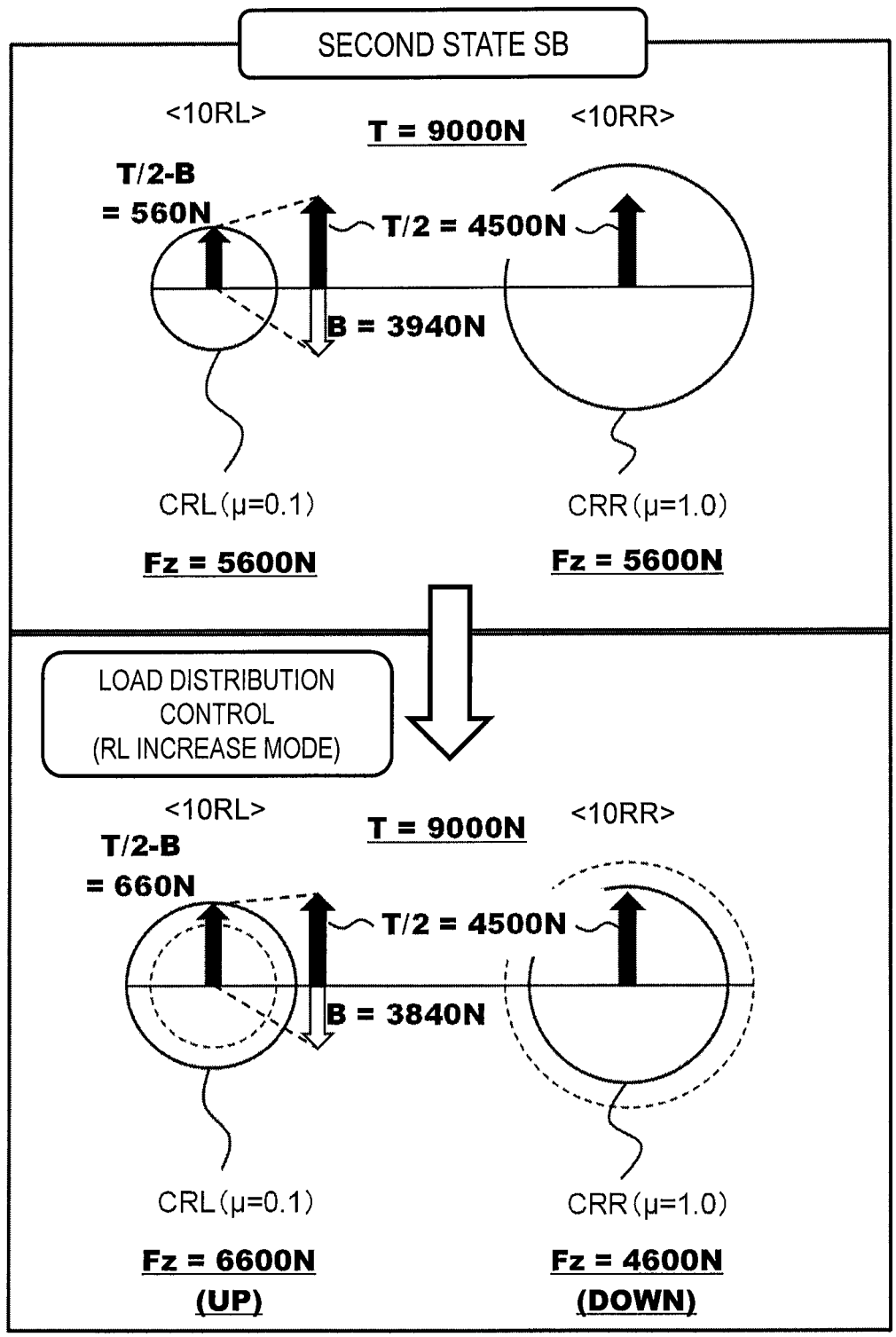
FIG. 6 is a conceptual diagram for explaining an effect when the load distribution control according to the present embodiment is performed in a second state.

FIG. 6 is a conceptual diagram for explaining an effect when the load distribution control (specifically, the RL increase mode) is performed in the second state SB. An overlapping description with the case shown in FIG. 5 will be omitted as appropriate.

First, let us consider a comparative example where the load distribution control is not performed. The driving force T is smaller than that in the first state SA shown in FIG. 5, and is 9000 N for example. The driving force T/2=4500 N is supplied to each of the high-μ side wheel 10RR and the low-μ side wheel 10RL. Regarding the high-μ side wheel 10RR, the driving force T/2 is smaller than the vertical load Fz (5600 N). The actual driving force of the low-μ side wheel 10RL is 560 N (=4500 N−3940 N) which is the same as that in the case of the first state SA. It should be noted that the braking force B necessary for suppressing slipping is 3940 N which is smaller than that in the case of the first state SA. The total actual driving force is 5060 N (=4500 N+560 N).

Next, let us consider a case where the load distribution control is performed. In the case of the second state SB, the load distribution control is performed in the "RL increase mode" among the two modes shown in FIG. 3. As a result, for example, the vertical load Fz on the high-μ side wheel 10RR is decreased by 1000 N to be 4600 N, and the vertical load Fz on the low-μ side wheel 10RL is increased by 1000 N to be 6600 N. In this case, it is possible to increase the actual driving force of the low-μ side wheel 10RL to 660 N. That is, the braking force B necessary for suppressing slipping is further decreased to be 3840 N. As a result, the actual driving force of the low-μ side wheel 10RL becomes 660 N (=4500 N−3840 N). Therefore, the total actual driving force becomes 5160 N (=4500 N+660 N). This means that the total actual driving force increases by about 2% as compared with the comparative example where the load distribution control is not performed.

In view of the above, it is preferable to perform the load distribution control in the RL increase mode when the driving force T/2 of the high-μ side wheel 10RR is smaller than the vertical load Fz. As a result, the vertical load Fz on the low-μ side wheel 10RL is increased, which makes it possible to increase the actual driving force of the low-μ side wheel 10RL and thus to increase the total actual driving force. In this case, there is no need to increase the driving force T. By decreasing the braking force B, it is possible to increase the actual driving force of the low-μ side wheel 10RL.

Figure 7:
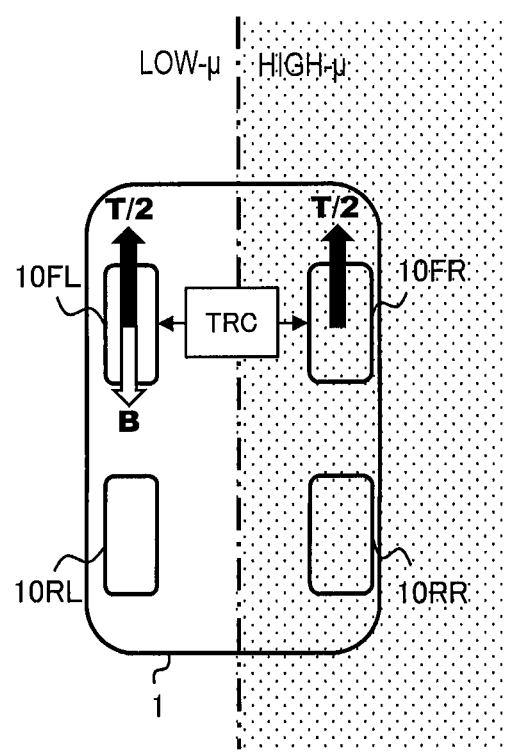
FIG. 7 is a conceptual diagram illustrating a case of front-wheel drive.

The case of the rear-wheel drive is exemplified in FIGS. 4 to 6. The load distribution control according to the present embodiment can be also applied to front-wheel drive (FWD) as shown in FIG. 7 and four-wheel drive (4WD). In the case of the front-wheel drive, not the RR increase mode but the RL increase mode is selected in the first state SA in order to increase the vertical load Fz on the high-μ side wheel 10FR. On the other hand, not the RL increase mode but the RR increase mode is selected in the second state SB in order to increase the vertical load Fz of the low-μ side wheel 10FL. That is to say, the mode to be selected in the case of the front-wheel drive is opposite to the mode to be selected in the case of the rear-wheel drive.

FIG. 8 is a diagram showing in a generalized manner the load distribution control according to the present embodiment. A "main drive wheel" is one of the front wheel (10FL, 10FR) and the rear wheel (10RL, 10RR) that is driven mainly. A "subordinate drive wheel" is the other of the front wheel (10FL, 10FR) and the rear wheel (10RL, 10RR). In the case of the front-wheel drive, the main drive wheel is the front wheel and the subordinate drive wheel is the rear wheel. In the case of the rear-wheel drive, the main drive wheel is the rear wheel and the subordinate drive wheel is the front wheel. In the case of the four-wheel drive, the main drive wheel is one of the front wheel and the rear wheel to which more driving force is distributed, and the subordinate drive wheel is the other of the front wheel and the rear wheel.

A "first active stabilizer" is one of the front active stabilizer 50 and the rear active stabilizer 60 that is installed on the side of the main drive wheel. A "second active stabilizer" is one of the front active stabilizer 50 and the rear active stabilizer 60 that is installed on the side of the subordinate drive wheel. In the case of the front-wheel drive, the first active stabilizer is the front active stabilizer 50 and the second active stabilizer is the rear active stabilizer 60. In the case of the rear-wheel drive, the first active stabilizer is the rear active stabilizer 60 and the second active stabilizer is the front active stabilizer 50.

In the first state SA, the load distribution control is performed in a "first mode". More specifically, in the first mode, the first active stabilizer is actuated in a direction to lift up the high-μ side and the second active stabilizer is actuated in a direction to lift up the low-μ side, in order to increase the vertical load Fz on the main drive wheel on the high-μ side. In the case of the front-wheel drive, the first mode is the RL increase mode shown in FIG. 3. In the case of the rear-wheel drive, the first mode is the RR increase mode shown in FIGS. 3 and 5. By performing the load distribution control in the first mode, the vertical load Fz on the main drive wheel on the high-μ side is increased, which makes it possible to efficiently increase the total actual driving force. As a result, the acceleration performance is increased.

In the second state SB, the load distribution control is performed in a "second mode". More specifically, in the second mode, the first active stabilizer is actuated in a direction to lift up the low-μ side and the second active stabilizer is actuated in a direction to lift up the high-μ side, in order to increase the vertical load Fz on the main drive wheel on the low-μ side. In the case of the front-wheel drive, the second mode is the RR increase mode shown in FIG. 3. In the case of the rear-wheel drive, the second mode is the RL increase mode shown in FIGS. 3 and 6. By performing the load distribution control in the second mode, the vertical load Fz on the main drive wheel on the low-μ side is increased, which makes it possible to increase the total actual driving force. As a result, the acceleration performance is increased.

The load distribution control according to the present embodiment may have only any one of the first mode and the second mode. Even in that case, at least the effect of increasing the acceleration performance can be obtained. For example, when the load distribution control has only the first mode, the acceleration performance is increased by using the first mode in the first state SA. When the load distribution control has only the second mode, the acceleration performance is increased by using the second mode in the second state SB.

1-3. Switch Between First Mode and Second Mode

According to the present embodiment, as described above, the first mode is selected in the first state SA, and the second mode is selected in the second state SB. Hereinafter, let us consider a policy of switch between the first mode and the second mode.

Figure 9:
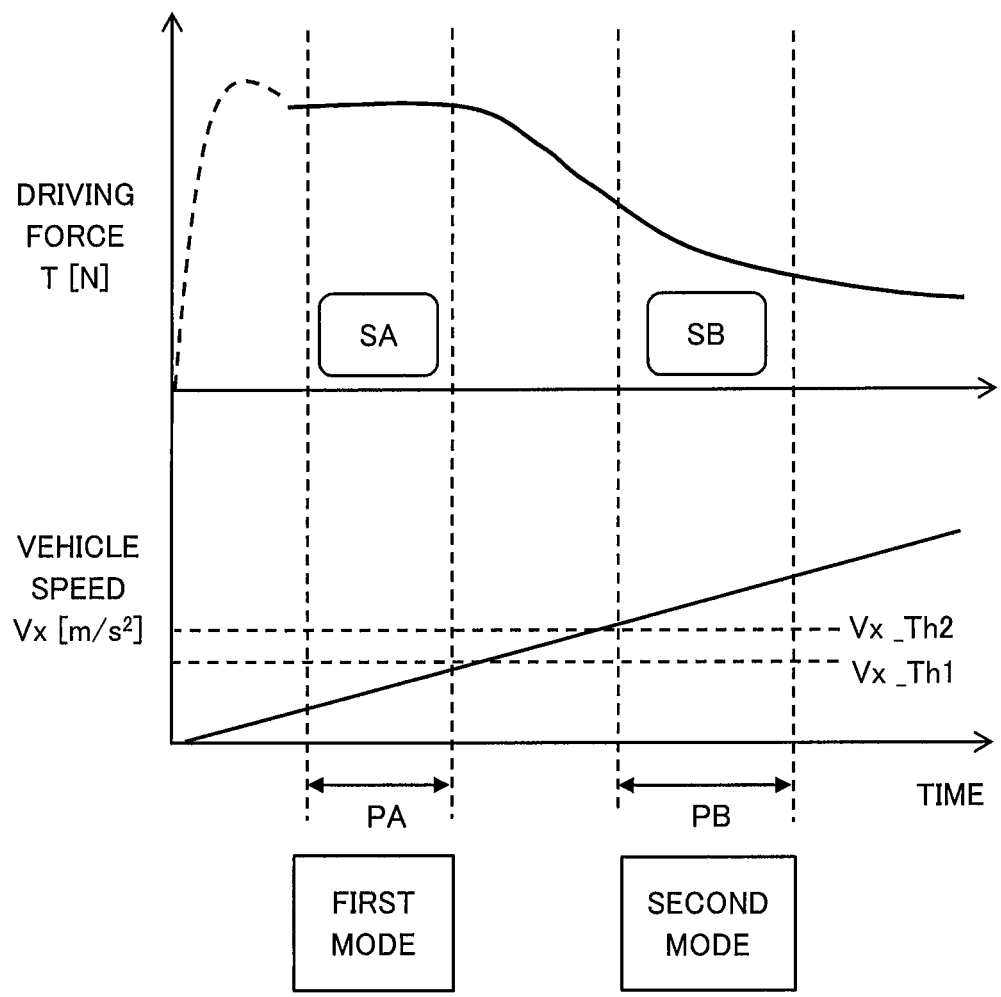
FIG. 9 is a timing chart for explaining switch between a first mode and a second mode of the load distribution control in the embodiment of the present disclosure.

FIG. 9 is a timing chart for explaining the switch between the first mode and the second mode of the load distribution control in the present embodiment. An example of change in the driving force T during the traction control is shown in FIG. 9. In addition, time change in a vehicle speed Vx (i.e. a speed of the vehicle 1) is shown in FIG. 9. When a driver steps on an accelerator pedal, the vehicle 1 starts moving and accelerates. The vehicle speed Vx gradually increases. Meanwhile, the driving force T tends to decrease with time.

More specifically, when slip of the low-μ side wheel is detected, the traction control applies the braking force B to the low-μ side wheel and decreases the driving force T. However, if the driving force T is decreased too much, a sufficient driving force T/2 cannot be obtained at the high-μ side wheel and thus the acceleration performance may be deteriorated. Therefore, the driving force T is set to be large to an extent preventing the high-μ side wheel from slipping. For example, under assumption that the coefficient of static friction on the high-μ side is 1.0, the driving force T is set to meet a condition "T/2=vertical load Fz on the high-μ side wheel 10RR". This state corresponds to the first state SA shown in FIG. 5.

In the first state SA, the slip of the low-μ side wheel is mainly suppressed by the application of the braking force B. However, it is not desirable that a state where a strong braking force B is applied continues for a long time during acceleration. Therefore, the traction control further decreases the driving force T after the first state SA. As a result, it is possible to decrease the braking force B necessary for suppressing the slip of the low-μ side wheel. This state corresponds to the second state SB shown in FIG. 6.

The first state SA appears at a comparatively early stage of an acceleration period of the vehicle 1. On the other hand, the second state SB appears at a later stage than the first state SA. To further generalize, let us consider a first period PA and a second period PB included in the acceleration period shown in FIG. 9. The first period PA corresponds to the first state SA. The second period PB is later than the first period PA and corresponds to the second state SB. The driving force T in the second period PB is smaller than the driving force T in the first period PA. The vehicle speed Vx in the second period PB is higher than the vehicle speed Vx in the first period PA.

For example, one of the simplest methods is to switch between the first mode and the second mode depending on the vehicle speed Vx. More specifically, in the first period PA corresponding to the first state SA, the vehicle speed Vx is equal to or lower than a first reference value Vx_Th1. In this case, the load distribution control is performed in the first mode. On the other hand, in the second period PB corresponding to the second state SB, the vehicle speed Vx is higher than a second reference value Vx_Th2. In this case, the load distribution control is performed in the second mode. Note that the second reference value Vx_Th2 is equal to or greater than the first reference value Vx_Th1. The second reference value Vx_Th2 may be equal to the first reference value Vx_Th1.

Another example is to switch between the first mode and the second mode depending on a relationship between the driving force T and the vertical load Fz. For the purpose of explanation, the driving force T/2 of and the vertical load Fz on the main drive wheel on the high-μ side are hereinafter referred to as a "high-μ side driving force" and a "high-μ side vertical load", respectively. Moreover, the coefficient of static friction on the high-μ side is assumed to be 1.0. A state where the high-μ side driving force is equal to or greater than the high-μ side vertical load corresponds to the first state SA shown in FIG. 5. Therefore, the load distribution control is performed in the first mode. On the other hand, a state where the high-μ side driving force is smaller than the high-μ side vertical load corresponds to the second state SB shown in FIG. 6. Therefore, the load distribution control is performed in the second mode.

As described above, by switching between the first mode and the second mode depending on the state of the vehicle 1 during acceleration, it is possible to effectively increase the total actual driving force.

Hereinafter, a configuration and processing according to the present embodiment will be described in more detail.

2. Configuration Example of Vehicle Travel Control Device

Figure 10:
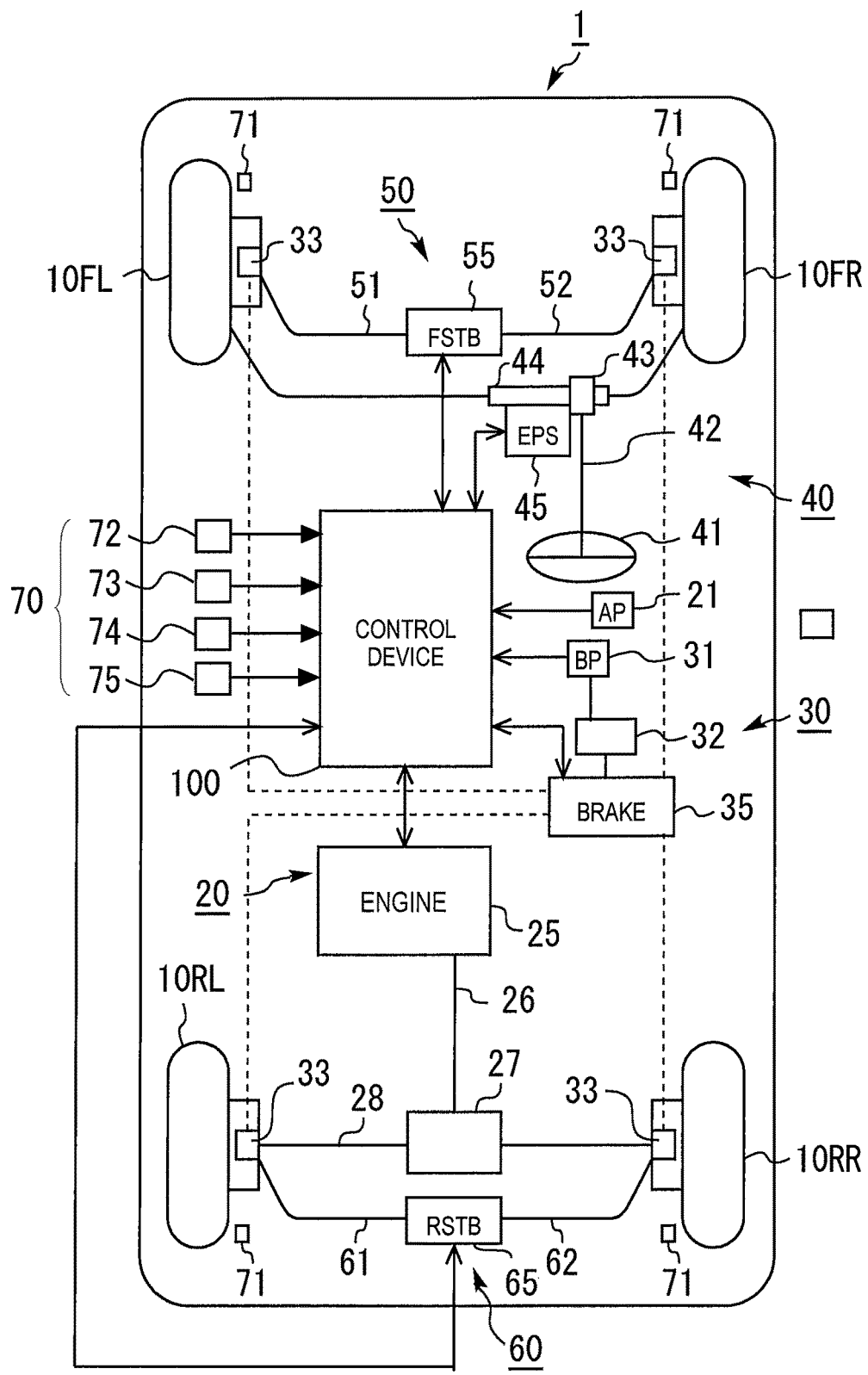
FIG. 10 is a block diagram showing a configuration example of a vehicle travel control device according to the embodiment of the present disclosure.

FIG. 10 is a block diagram showing a configuration example of a vehicle travel control device according to the present embodiment. The vehicle travel control device is mounted on the vehicle 1. The vehicle travel control device is provided with a driving device 20, a braking device 30, a turning device 40, a front active stabilizer 50, a rear active stabilizer 60, a sensor group 70, and a control device 100.

2-1. Driving Device

The driving device 20 is a device for driving the vehicle 1. In the case of the front-wheel drive, the driving device 20 drives the front wheel being the main drive wheel. In the case of the rear-wheel drive, the driving device 20 drives the rear wheel being the main drive wheel. In the case of the four-wheel drive, the driving device 20 drives both the main drive wheel and the subordinate drive wheel.

As an example, the case of the rear-wheel drive is shown in FIG. 10. More specifically, the driving device 20 includes an accelerator pedal 21, an engine 25, a propeller shaft 26, a differential gear 27, and a drive shaft 28. The accelerator pedal 21 is an operating member used by the driver for performing an acceleration operation. A stroke amount of the accelerator pedal 21 is detected by an accelerator pedal sensor (not shown) and the detected information is sent to the control device 100.

The engine 25 is a driving force generation device for generating the driving force. An electric motor instead of the engine 25 may be used as the driving force generation device. The engine 25 generates the driving force T in accordance with an instruction from the control device 100. The driving force T is distributed to the left rear wheel 10RL and the right rear wheel 10RR through the propeller shaft 26, the differential gear 27, and the drive shaft 28.

2-2. Braking Device

The braking device 30 is a device for generating the braking force. The braking device 30 includes a brake pedal 31, a master cylinder 32, wheel cylinders 33, and a brake actuator 35. The brake pedal 31 is an operating member used by the driver for performing a braking operation. The master cylinder 32 is connected to the wheel cylinders 33 through the brake actuator 35. The wheel cylinder 33 is provided for each of the left front wheel 10FL, the right front wheel 10FR, the left rear wheel 10RL, and the right rear wheel 10RR.

The master cylinder 32 supplies a brake fluid of a pressure corresponding to a stroke amount of the brake pedal 31 to the brake actuator 35. The brake actuator 35 distributes the brake fluid output from the master cylinder 32 to the wheel cylinders 33. The braking force at each wheel is determined depending on a pressure of the brake fluid supplied to the corresponding wheel cylinder 33.

Here, the brake actuator 35 is able to individually adjust the respective pressures of the brake fluids supplied to the wheel cylinders 33. That is, the brake actuator 35 is able to individually adjust the respective braking forces of the left front wheel 10FL, the right front wheel 10FR, the left rear wheel 10RL, and the right rear wheel 10RR. The operation of the brake actuator 35 is controlled by the control device 100. That is, the control device 100 is able to actuate the brake actuator 35 to control the braking force of each wheel.

2-3. Turning Device

The turning device 40 is a device for turning the front wheel (10FL, 10FR). The turning device 40 includes a steering wheel 41, a steering shaft 42, a pinion gear 43, a rack bar 44, and an EPS (Electric Power Steering) device 45.

The steering wheel 41 is an operating member used by the driver for performing a steering operation. One end of the steering shaft 42 is connected to the steering wheel 41, and the other end thereof is connected to the pinion gear 43. The pinion gear 43 engages with the rack bar 44. Both ends of the rack bar 44 are respectively connected to the left and right front wheels. A rotation of the steering wheel 41 is transmitted to the pinion gear 43 through the steering shaft 42. A rotational motion of the pinion gear 43 is converted into a linear motion of the rack bar 44, and thereby a steering angle of the front wheel changes.

The EPS device 45 is a device for generating a turning torque to turn the front wheel. More specifically, the EPS device 45 includes an electric motor. For example, the electric motor is connected to the rack bar 44 through a conversion mechanism. The conversion mechanism is a ball screw, for example. When a rotor of the electric motor rotates, the conversion mechanism converts the rotational motion into a linear motion of the rack bar 44, and thereby the steering angle of the front wheel changes. The operation of the EPS device 45 is controlled by the control device 100. That is, the control device 100 is able to actuate the EPS device 45 to turn the front wheel.

2-4. Active Stabilizer

The front active stabilizer 50 is installed on the front wheel side of the vehicle 1. The front active stabilizer 50 includes stabilizer bars 51 and 52, and a stabilizer actuator 55. The stabilizer bar 51 is connected through a link rod to a suspension arm provided for the left front wheel 10FL. The stabilizer bar 52 is connected through a link rod to a suspension arm provided for the right front wheel 10FR.

The stabilizer actuator 55 includes an electric motor. One of the stabilizer bars 51 and 52 is connected so as to rotate integrally with a stator of the electric motor. The other of the stabilizer bars 51 and 52 is connected to a rotor of the electric motor. By rotating the electric motor, it is possible to twist the stabilizer bars 51 and 52 in opposite directions. A rotating operation of the electric motor also is controlled by the control device 100. The control device 100 is able to actively control the roll angle of the vehicle 1 by actuating the front active stabilizer 50.

The rear active stabilizer 60 is installed on the rear wheel side of the vehicle 1. The rear active stabilizer 60 includes stabilizer bars 61 and 62, and a stabilizer actuator 65. The stabilizer bar 61 is connected through a link rod to a suspension arm provided for the left rear wheel 10RL. The stabilizer bar 62 is connected through a link rod to a suspension arm provided for the right rear wheel 10RR.

The stabilizer actuator 65 includes an electric motor. One of the stabilizer bars 61 and 62 is connected so as to rotate integrally with a stator of the electric motor. The other of the stabilizer bars 61 and 62 is connected to a rotor of the electric motor. By rotating the electric motor, it is possible to twist the stabilizer bars 61 and 62 in opposite directions. A rotating operation of the electric motor also is controlled by the control device 100. The control device 100 is able to actively control the roll angle of the vehicle 1 by actuating the rear active stabilizer 60.

2-5. Sensor Group

The sensor group 70 is provided for detecting a variety of state quantities of the vehicle 1. For example, the sensor group 70 includes wheel speed sensors 71, a vehicle speed sensor 72, a yaw rate sensor 73, a longitudinal acceleration sensor 74, and a lateral acceleration sensor 75.

The wheel speed sensors 71 are provided for the wheels 10FL, 10FR, 10RL, and 10RR, respectively. The wheel speed sensors 71 respectively detect rotational speeds of the wheels 10FL, 10FR, 10RL, and 10RR, and output detected information indicating the detected rotational speeds to the control device 100.

The vehicle speed sensor 72 detects the vehicle speed that is a speed of the vehicle 1. The vehicle speed sensor 72 outputs detected information indicating the detected vehicle speed to the control device 100.

The yaw rate sensor 73 detects an actual yaw rate of the vehicle 1. The yaw rate sensor 73 outputs detected information indicating the detected actual yaw rate to the control device 100.

The longitudinal acceleration sensor 74 detects a longitudinal acceleration Gx acting on the vehicle 1. The longitudinal acceleration sensor 74 outputs detected information indicating the detected longitudinal acceleration Gx to the control device 100.

The lateral acceleration sensor 75 detects a lateral acceleration Gy acting on the vehicle 1. The lateral acceleration sensor 75 outputs detected information indicating the detected lateral acceleration Gy to the control device 100.

2-6. Control Device

The control device 100 is a controller that performs the vehicle travel control according to the present embodiment. Typically, the control device 100 is a microcomputer including a processor, a memory, and an input/output interface. The control device 100 is also called an ECU (Electronic Control Unit). The control device 100 receives the detected information from the sensor group 70 and sends instructions to a variety of actuators and devices (25, 35, 45, 55, 65) through the input/output interface.

Hereinafter, functions and processing flow of the control device 100 according to the present embodiment will be described in more detail.

3. Functions and Processing Flow of Control Device

Figure 11:
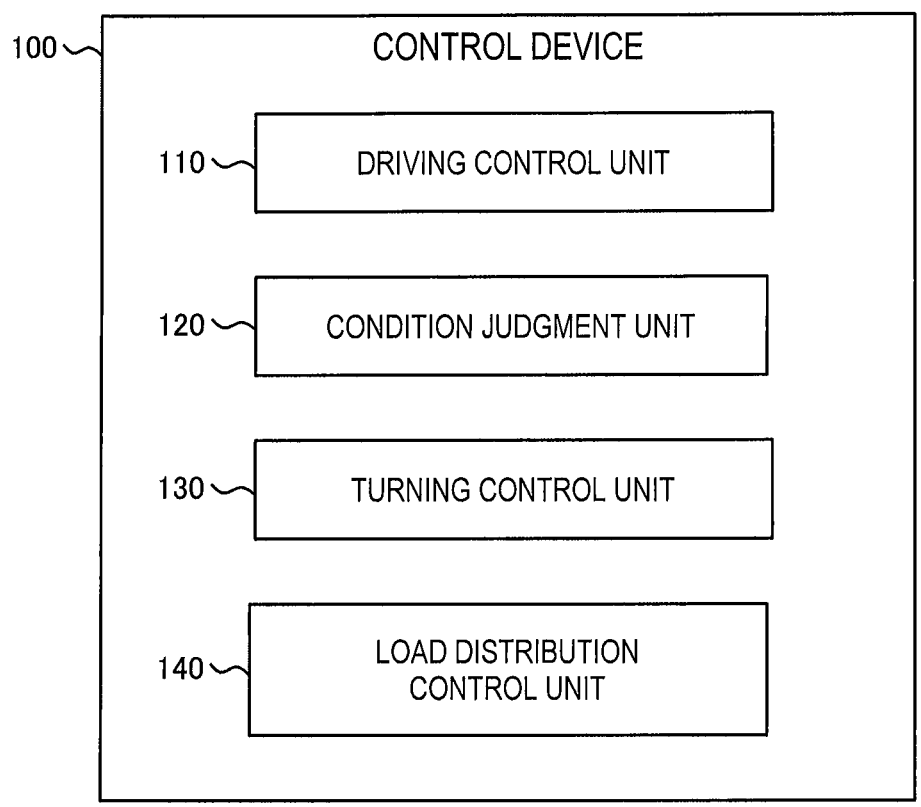
FIG. 11 is a block diagram showing a functional configuration of a control device of the vehicle travel control device according to the embodiment of the present disclosure.

FIG. 11 is a block diagram showing a functional configuration of the control device 100 according to the present embodiment. The control device 100 includes, as functional blocks, a driving control unit 110, a condition judgment unit 120, a turning control unit 130, and a load distribution control unit 140. These functional blocks are achieved by the processor of the control device 100 executing a control program stored in the memory. The control program may be recorded on a computer-readable recording medium.

Figure 12:
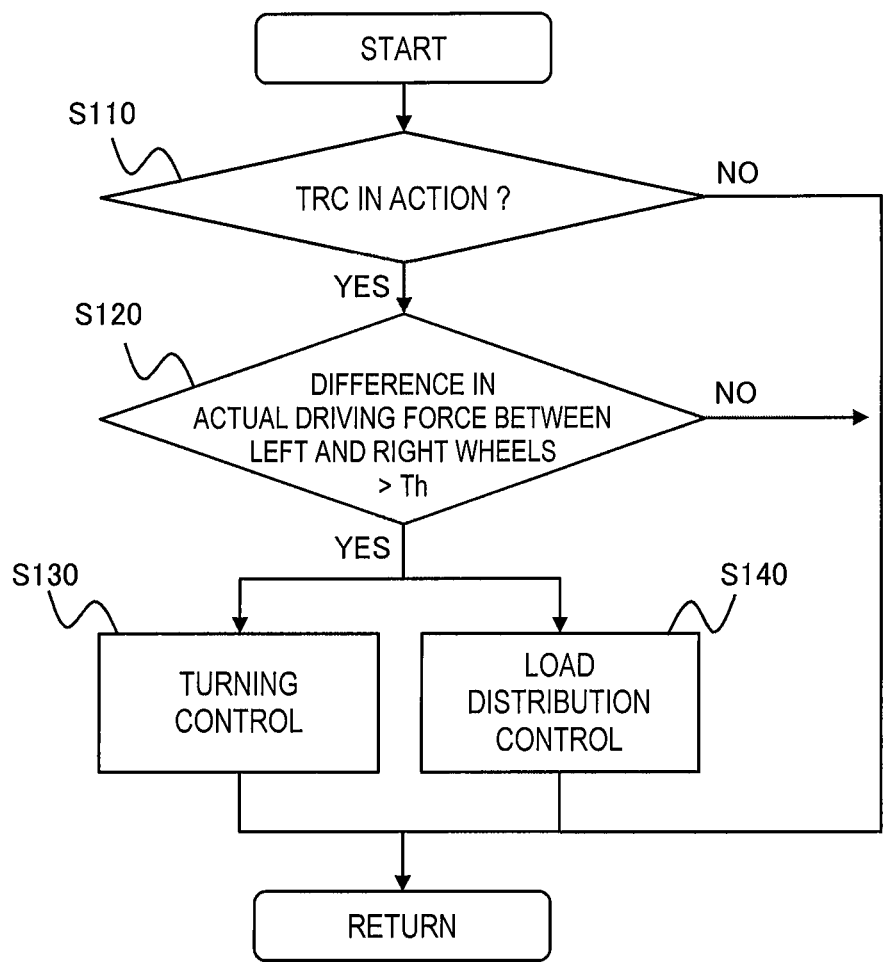
FIG. 12 is a flow chart showing processing by the control device of the vehicle travel control device according to the embodiment of the present disclosure.

FIG. 12 is a flow chart showing processing by the control device 100 according to the present embodiment. The control device 100 repeatedly executes a processing flow shown in FIG. 12.

3-1. Step S110 (Driving Control Processing)

The driving control unit 110 performs driving control. More specifically, when the driver steps on the accelerator pedal 21, detected information of a stroke amount of the accelerator pedal 21 is sent to the control device 100. The driving control unit 110 determines the driving force T according to the stroke amount. Then, the driving control unit 110 controls the operation of the engine 25 to achieve the driving force T. The driving force T generated by the engine 25 is equally distributed to the left rear wheel 10RL and the right rear wheel 10RR through the differential gear 27. That is, the driving force T/2 is given to each of the left rear wheel 10RL and the right rear wheel 10RR.

Furthermore, the driving control unit 110 performs the traction control (TRC). More specifically, the driving control unit 110 detects a wheel exhibiting a slip sign. A wheel exhibiting a slip sign means that a slip amount or a slip ratio of said wheel exceeds a threshold value. The driving control unit 110 can calculate a slip amount and a slip ratio of a wheel based on a rotational speed of said wheel and the vehicle speed. The rotational speed of each wheel is detected by the wheel speed sensor 71. The vehicle speed is detected by the vehicle speed sensor 72. Alternatively, the vehicle speed may be calculated from the rotational speeds of the wheels. Based on the detected information, the driving control unit 110 can judge whether or not any wheel exhibits the slip sign.

The wheel exhibiting the slip sign is a target wheel being a target of the traction control. Typically, the target wheel is the low-μ side wheel. In order to prevent the target wheel from slipping, the driving control unit 110 controls the brake actuator 35 of the braking device 30 to apply the braking force B to the target wheel. Moreover, the driving control unit 110 decreases the driving force T as appropriate in order to suppress slip of the target wheel.

Here, if the driving force T is decreased too much, the acceleration performance may be deteriorated. Therefore, in the first state SA (i.e. the first period PA), the driving control unit 110 sets the driving force T to be large to an extent preventing the high-μ side wheel from slipping. For example, under assumption that the coefficient of static friction on the high-μ side is 1.0, the driving control unit 110 sets the driving force T to meet a condition "T/2=vertical load Fz on the high-μ side wheel". In the second state SB (i.e. the second period PB) after the first state SA, the driving control unit 110 further decreases the driving force T as compared with the case of the first state SA.

When the traction control is in action (Step S110; Yes), the processing proceeds to Step S120. Otherwise (Step S110; No), the current processing cycle ends.

3-2. Step S120 (Condition Judgment Processing)

The condition judgment unit 120 judges whether or not the difference in actual driving force between left and right wheels exceeds a threshold value Th. In the example shown in FIGS. 4 to 6, the actual driving force of the high-μ side wheel 10RR is "T/2", and the actual driving force of the low-μ side wheel 10RL is "T/2−B". Therefore, the condition judgment unit 120 can calculate the difference in actual driving force based on the driving force T and the braking force B. Alternatively, since the difference in actual driving force is equivalent to a difference in braking force between the high-μ side wheel 10RR and the low-μ side wheel 10RL, the condition judgment unit 120 can calculate the difference in braking force as the difference in actual driving force.

When the difference in actual driving force exceeds the threshold value Th (Step S120; Yes), the processing proceeds to Step S130 and Step S140. Otherwise (Step S120; No), the current processing cycle ends.

3-3. Step S130 (Turning Control Processing)

The difference in actual driving force between left and right wheels causes a yaw moment of the vehicle 1. For vehicle stabilization, the turning control unit 130 performs turning control to counteract such the yaw moment. In the turning control, the turning control unit 130 uses the EPS device 45 of the turning device 40 to turn the front wheel. If the vehicle 1 is further provided with a device for turning the rear wheel, the rear wheel may be turned simultaneously.

A target steering angle is determined based on the difference in actual driving force. For example, the turning control unit 130 holds a steering angle map that defines a relationship between an input parameter and the target steering angle. As the input parameter, (a) the difference in actual driving force, (b) a yaw moment expected from the difference in actual driving force, and the like are exemplified. As the value of the input parameter increases, the target steering angle increases accordingly. The turning control unit 130 uses the input parameter and the steering angle map to obtain the target steering angle. Then, the turning control unit 130 actuates the EPS device 45 such that the target steering angle is achieved.

3-4. Step S140 (Load Distribution Control Processing)

The load distribution control unit 140 performs the load distribution control according to the present embodiment in order to increase the total actual driving force. As described above, there are two types of the load distribution control, the first mode and the second mode (see FIGS. 3, 5, 6, 8, and 9). The load distribution control unit 140 properly uses the first mode and the second mode depending on the state of the vehicle 1. A condition for selecting the first mode is hereinafter referred to as a "first mode condition". On the other hand, a condition for selecting the second mode is hereinafter referred to as a "second mode condition".

For example, one of the simplest methods is to switch between the first mode and the second mode depending on the vehicle speed Vx (see FIG. 9). In this case, the first mode condition is that "the vehicle speed Vx is equal to or lower than the first reference value Vx_Th1". On the other hand, the second mode condition is that "the vehicle speed Vx is higher than the second reference value Vx_Th2". The vehicle speed Vx can be obtained from the vehicle speed sensor 72. The second reference value Vx_Th2 is equal to or greater than the first reference value Vx_Th1. The second reference value Vx_Th2 may be equal to the first reference value Vx_Th1.

Another example is to switch between the first mode and the second mode depending on a relationship between the high-μ side driving force T/2 and the high-μ side vertical load Fz. More specifically, the first mode condition is that "the high-μ side driving force T/2 is equal to or greater than the high-μ side vertical load Fz" (see FIG. 5). On the other hand, the second mode condition is that "the high-μ side driving force T/2 is smaller than the high-μ side vertical load Fz" (see FIG. 6).

In the case of the rear-wheel drive, the high-μ side vertical load Fz during acceleration is given by an equation "static vertical load Fz0+load transfer amount ΔFz". In the case of the front-wheel drive, the high-μ side vertical load Fz during acceleration is given by an equation "static vertical load Fz0−load transfer amount ΔFz". The static vertical load Fz0 per wheel is calculated in advance based on a vehicle mass, longitudinal weight distribution, and so forth. The load transfer amount ΔFz per wheel is given by the following Equation (1).

[Equation (1)]

$$\Delta Fz = 0.5 mGx \frac{h}{l} \quad (1)$$

Here, m is a mass of the vehicle 1, Gx is the longitudinal acceleration which can be obtained by the longitudinal acceleration sensor 74, h is a center of gravity height of the vehicle, and l is a wheelbase of the vehicle 1.

Figure 13:
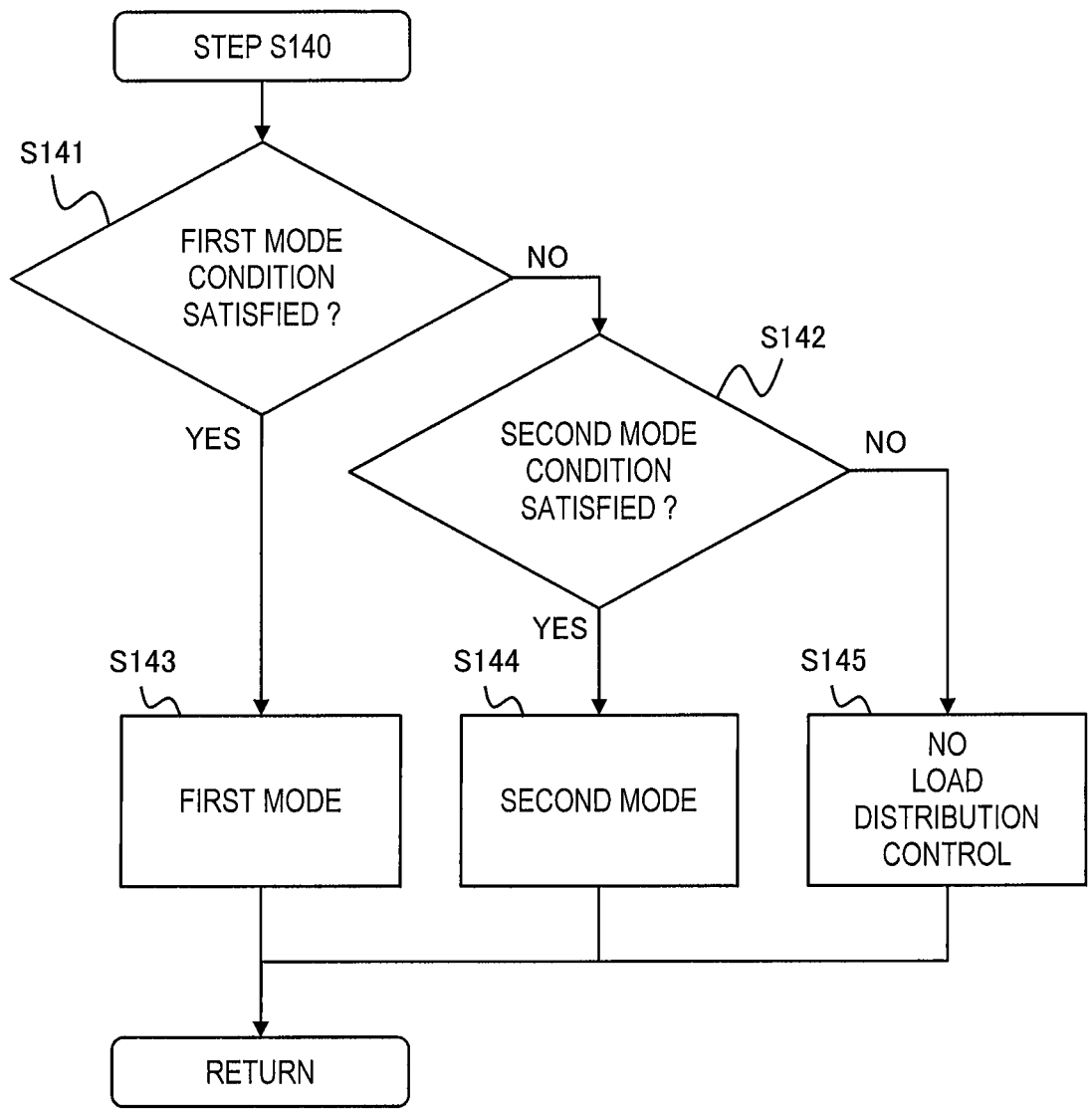
FIG. 13 is a flow chart showing in a summarized manner the load distribution control (Step S140) according to the embodiment of the present disclosure.

FIG. 13 is a flow chart showing in a summarized manner the load distribution control (Step S140) according to the present embodiment. The load distribution control unit 140 judges whether or not any of the first mode condition and the second mode condition is satisfied (Steps S141, 142).

When the first mode condition is satisfied (Step S141; Yes), the load distribution control unit 140 performs the load distribution control in the first mode (Step S143). More specifically, the load distribution control unit 140 actuates the first active stabilizer in a direction to lift up the high-μ side and actuates the second active stabilizer in a direction to lift up the low-μ side.

When the second mode condition is satisfied (Step S141; No, Step S142; Yes), the load distribution control unit 140 performs the load distribution control in the second mode (Step S144). More specifically, the load distribution control unit 140 actuates the first active stabilizer in a direction to lift up the low-μ side and actuates the second active stabilizer in a direction to lift up the high-μ side.

When none of the first mode condition and the second mode condition is satisfied (Step S141; No, Step S142; No), the load distribution control unit 140 does not perform the load distribution control (Step S145).

Figure 14:
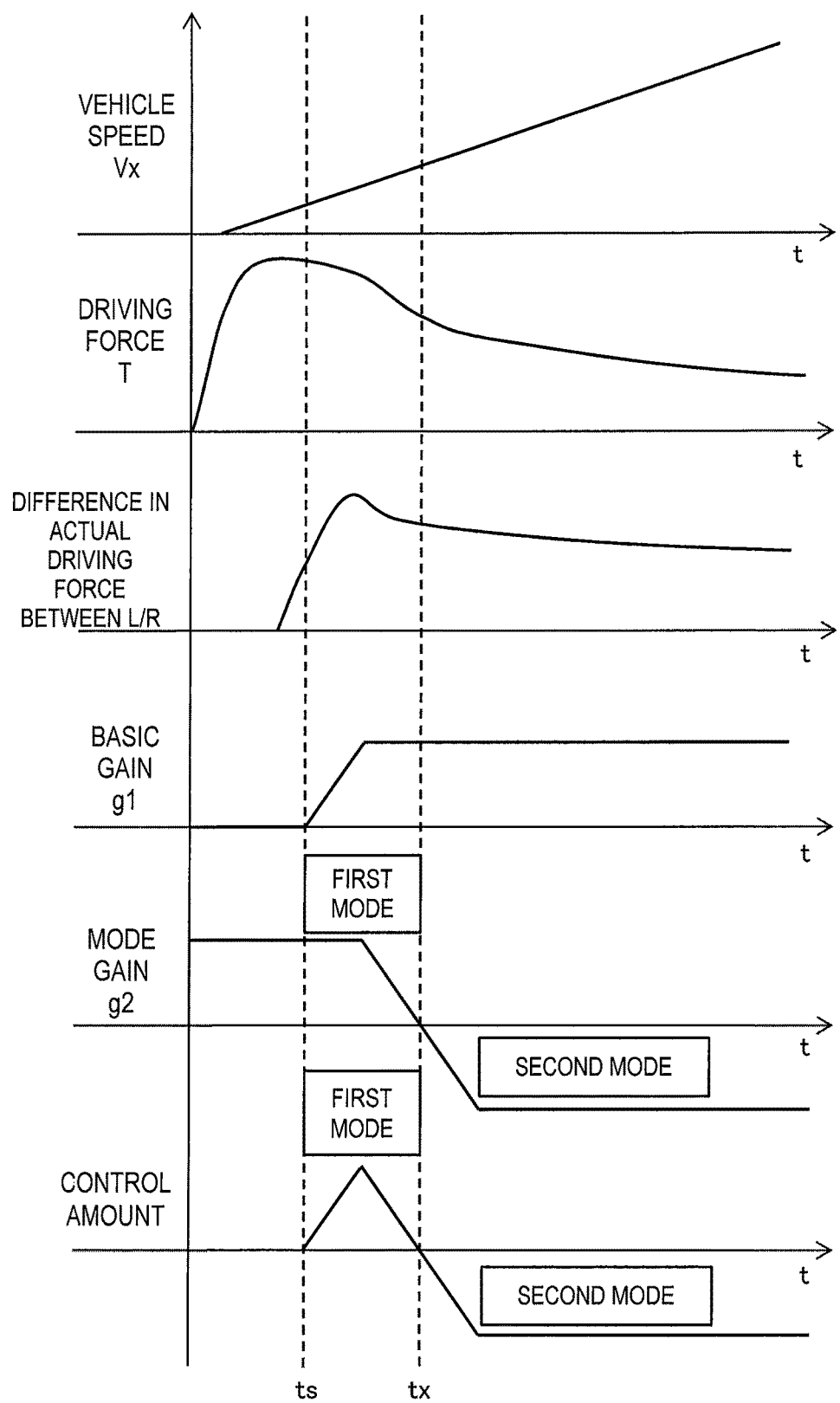
FIG. 14 is a timing chart showing an example of vehicle travel control according to the embodiment of the present disclosure.

FIG. 14 is a timing chart showing an example of vehicle travel control according to the present embodiment. When the vehicle 1 starts moving, the control device 100 generates a large driving force T. The vehicle 1 accelerates and the vehicle speed Vx gradually increases. If the low-μ side wheel exhibits a slip sign, the control device 100 performs the traction control (see FIG. 12, Step S110; Yes). The control device 100 decreases the driving force T and applies the braking force B to the low-μ side wheel.

At a time ts, a difference in actual driving force between left and right wheels exceeds the threshold value Th (see FIG. 12, Step S120; Yes). In response to that, the control device 100 performs the load distribution control (see FIG. 12, Step S140). At first, the load distribution control is performed in the first mode (see FIG. 13, Step S143). At a time tx, the load distribution control is switched from the first mode to the second mode (see FIG. 13, Step S144).

A control amount of each active stabilizer (50, 60) during the load distribution control is expressed by the following Equation (2), for example.

[Equation (2)]

$$\text{Control amount} = \text{Basic gain } g1 \times \text{Mode gain } g2 \quad (2)$$

The basic gain g1 is set to a value greater than 0, when the difference in actual driving force between left and right wheels exceeds the threshold value Th. The basic gain g1 may be expressed as a function of the difference in actual driving force. In that case, the basic gain g1 becomes larger as the difference in actual driving force becomes larger. The basic gain g1 may change gradually as shown in FIG. 14.

The mode gain g2 is switched according to the mode of the load distribution control. For example, the mode gain g2 is +1.0 in the first mode and −1.0 in the second mode. The mode gain g2 may change gradually as shown in FIG. 14.

As a modification example, let us consider a case where the vehicle 1 is cornering. When the vehicle 1 is cornering, the front active stabilizer 50 and the rear active stabilizer 60 are required to achieve their primary role, that is, to suppress roll change. To that end, correction is made so as to reduce the control amount for the load distribution control. More specifically, in the present modification example, the control amount of each active stabilizer (50, 60) is expressed by the following Equation (3).

[Equation (3)]

$$\text{Control amount} = \text{Basic gain } g1 \times \text{Mode gain } g2 \times \text{Correction gain } g3 \quad (3)$$

Figure 15:
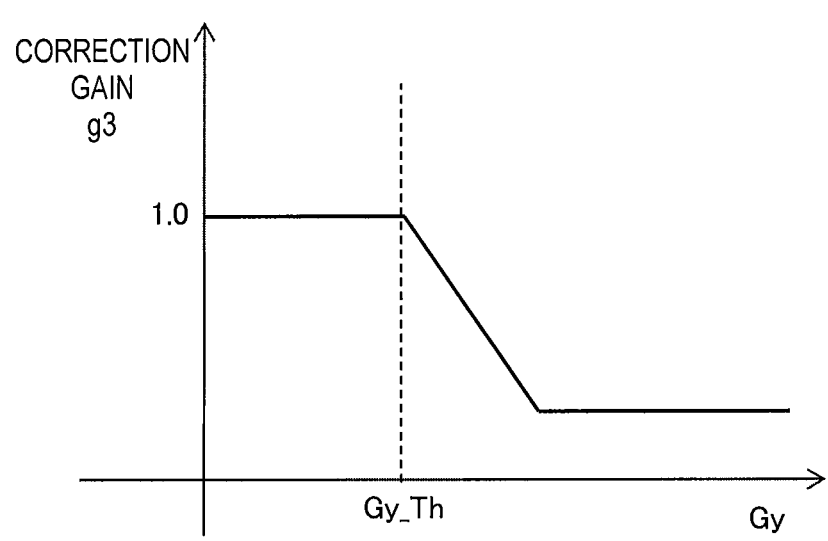
FIG. 15 is a diagram showing an example of a correction gain in the embodiment of the present disclosure.

FIG. 15 is a diagram showing an example of the correction gain g3. A horizontal axis represents the lateral acceleration Gy, and a vertical axis represents the correction gain g3. The lateral acceleration Gy can be obtained from the lateral acceleration sensor 75. When the lateral acceleration Gy is lower than a lateral acceleration threshold value Gy_Th, the correction gain g3 is 1.0. When the lateral acceleration Gy is equal to or higher than the lateral acceleration threshold value Gy_Th, the correction gain g3 is less than 1.0.

In other words, when the vehicle 1 corners and the lateral acceleration Gy becomes equal to or higher than the lateral acceleration threshold value Gy_Th, the control device 100 multiplies the control amount by the correction gain g3 less than 1. In other words, the control device 100 reduces the control amount of the active stabilizer (50, 60) for the load distribution control. As a result, priority is given to suppressing the roll change which is the primary role of the active stabilizer.

What is claimed is:

1. A vehicle travel control device comprising:
   a driving device driving at least a main drive wheel among the main drive wheel and a subordinate drive wheel of a vehicle;
   a first active stabilizer installed on a side of the main drive wheel;
   a second active stabilizer installed on a side of the subordinate drive wheel; and
   a control device performing load distribution control when a difference in actual driving force between a left side and a right side of the vehicle exceeds a threshold value during acceleration,
   wherein a high-μ side is one of the left side and the right side of the vehicle with a greater actual driving force, and a low-μ side is another of the left side and the right side of the vehicle,
   wherein the load distribution control includes:
      a first mode performed when a speed of the vehicle is equal to or lower than a first reference value; and
      a second mode performed when the speed of the vehicle is higher than a second reference value equal to or greater than the first reference value,
   wherein in the first mode, the control device actuates the first active stabilizer in a direction to lift up the high-μ side and actuates the second active stabilizer in a direction to lift up the low-μ side, and
   wherein in the second mode, the control device actuates the first active stabilizer in a direction to lift up the low-μ side and actuates the second active stabilizer in a direction to lift up the high-μ side.

2. The vehicle travel control device according to claim 1, wherein the control device is configured to:
   perform driving control that controls the driving device to generate a driving force and accelerate the vehicle;
   perform traction control that applies a braking force to a target wheel exhibiting a slip sign during acceleration by the driving control; and
   perform the load distribution control when the traction control is performed during acceleration and the difference in the actual driving force between the left side and the right side of the vehicle exceeds the threshold value.

3. The vehicle travel control device according to claim 1, wherein a period of the acceleration includes a first period and a second period later than the first period,
   wherein in the first period, the speed is equal to or lower than the first reference value and the control device performs the load distribution control in the first mode, and
   wherein in the second period, the speed is higher than the second reference value and the control device performs the load distribution control in the second mode.

4. The vehicle travel control device according to claim 3, wherein the control device controls the driving device such that a driving force by the driving device becomes smaller in the second period than in the first period.

5. The vehicle travel control device according to claim 1, wherein when a lateral acceleration of the vehicle is equal to or higher than a lateral acceleration threshold value, the control device multiplies a control amount of each of the first active stabilizer and the second active stabilizer for the load distribution control by a correction gain less than 1.

6. The vehicle travel control device according to claim 1, wherein the control device performs the load distribution control such that a roll moment caused by actuation of the first active stabilizer and a roll moment caused by actuation of the second active stabilizer are balanced.

7. A vehicle travel control device comprising:
a driving device driving at least a main drive wheel among the main drive wheel and a subordinate drive wheel of a vehicle;
a first active stabilizer installed on a side of the main drive wheel;
a second active stabilizer installed on a side of the subordinate drive wheel; and
a control device configured to:
  perform driving control that controls the driving device to generate a driving force and accelerate the vehicle;
  perform traction control that applies a braking force to a target wheel exhibiting a slip sign during acceleration by the driving control; and
  perform load distribution control when the traction control is performed during acceleration and a difference in actual driving force between a left side and a right side of the vehicle exceeds a threshold value,
wherein a high-µ side is one of the left side and the right side with a greater actual driving force, and a low-µ side is another of the left side and the right side of the vehicle, and
wherein when a speed of the vehicle is higher than a reference value, the control device actuates the first active stabilizer in a direction to lift up the low-µ side and actuates the second active stabilizer in a direction to lift up the high-µ side.

8. The vehicle travel control device according to claim 7, wherein when a lateral acceleration of the vehicle is equal to or higher than a lateral acceleration threshold value, the control device multiplies a control amount of each of the first active stabilizer and the second active stabilizer for the load distribution control by a correction gain less than 1.

9. The vehicle travel control device according to claim 7, wherein the control device performs the load distribution control such that a roll moment caused by actuation of the first active stabilizer and a roll moment caused by actuation of the second active stabilizer are balanced.

10. A vehicle travel control device comprising:
a driving device driving at least a main drive wheel among the main drive wheel and a subordinate drive wheel of a vehicle;
a first active stabilizer installed on a side of the main drive wheel;
a second active stabilizer installed on a side of the subordinate drive wheel; and
a control device performing load distribution control when a difference in actual driving force between a left side and a right side of the vehicle exceeds a threshold value during acceleration,
wherein a high-µ side is one of the left side and the right side with a greater actual driving force, and a low-µ side is another of the left side and the right side,
wherein a driving force of and a vertical load on the main drive wheel on the high-µ side are a high-µ side driving force and a high-µ side vertical load, respectively,
wherein the load distribution control includes a first mode performed when the high-µ side driving force is equal to or greater than the high-µ side vertical load, and
wherein in the first mode, the control device actuates the first active stabilizer in a direction to lift up the high-µ side and actuates the second active stabilizer in a direction to lift up the low-µ side.

11. The vehicle travel control device according to claim 10,
wherein the load distribution control further includes a second mode performed when the high-µ side driving force is smaller than the high-µ side vertical load,
wherein in the second mode, the control device actuates the first active stabilizer in a direction to lift up the low-µ side and actuates the second active stabilizer in a direction to lift up the high-µ side.

12. The vehicle travel control device according to claim 11,
wherein a period of the acceleration includes a first period and a second period later than the first period,
wherein the control device controls the driving device such that a driving force by the driving device becomes smaller in the second period than in the first period,
wherein in the first period, the control device performs the load distribution control in the first mode, and
wherein in the second period, the control device performs the load distribution control in the second mode.

13. The vehicle travel control device according to claim 10,
wherein when a lateral acceleration of the vehicle is equal to or higher than a lateral acceleration threshold value, the control device multiplies a control amount of each of the first active stabilizer and the second active stabilizer for the load distribution control by a correction gain less than 1.

14. The vehicle travel control device according to claim 10,
wherein the control device performs the load distribution control such that a roll moment caused by actuation of the first active stabilizer and a roll moment caused by actuation of the second active stabilizer are balanced.

* * * * *